United States Patent [19]

Iimura

[11] 4,108,510
[45] Aug. 22, 1978

[54] RECORD PLAYER CABINET
[75] Inventor: Koichi Iimura, Tokyo, Japan
[73] Assignee: Trio Kabushiki Kaisha, Tokyo, Japan
[21] Appl. No.: 767,211
[22] Filed: Feb. 9, 1977
[30] Foreign Application Priority Data Mar. 19, 1976 [JP] Japan .............................. 51-34024[U]

[51] Int. Cl.² .......................... A47B 81/06; G11B 3/10
[52] U.S. Cl. ......................................... 312/8; 312/10; 274/23 R
[58] Field of Search ...................... 312/7 TV, 8, 9, 10, 312/11, 1 Z; 274/2, 23

[56] References Cited
U.S. PATENT DOCUMENTS

| Re. 25,197 | 7/1962 | Hicks | 274/23 R |
|---|---|---|---|
| 1,868,958 | 7/1932 | Wenderoth | 274/2 |
| 2,819,088 | 1/1958 | Boisselier et al. | 274/23 R |
| 2,983,516 | 5/1961 | Bauer et al. | 274/23 R |
| 3,261,609 | 7/1966 | Geiger, Jr. | 274/23 R |
| 3,529,834 | 9/1970 | Renoux | 274/23 R |
| 3,556,537 | 1/1971 | Stacy | 274/23 R |
| 3,964,808 | 6/1976 | Suzuki | 312/8 |

Primary Examiner—Paul R. Gilliam
Assistant Examiner—Victor N. Sakran
Attorney, Agent, or Firm—Gerald J. Ferguson, Jr.; Joseph J. Baker

[57] ABSTRACT

A cabinet for a record player comprising a cabinet body molded from hard resin concrete with large mass, a base of wood adhered to the bottom of the cabinet body and a plate adapted for attachment of a tone arm, the plate being composed of wood and adhered to the top of the cabinet body.

6 Claims, 6 Drawing Figures

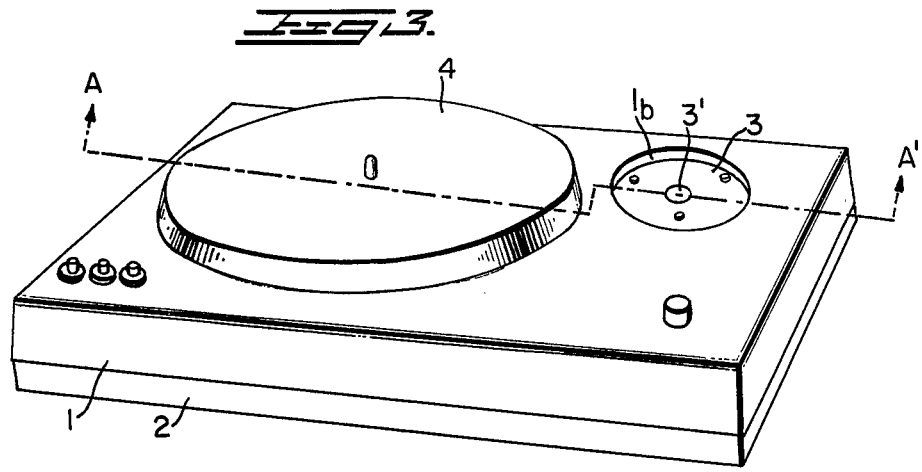
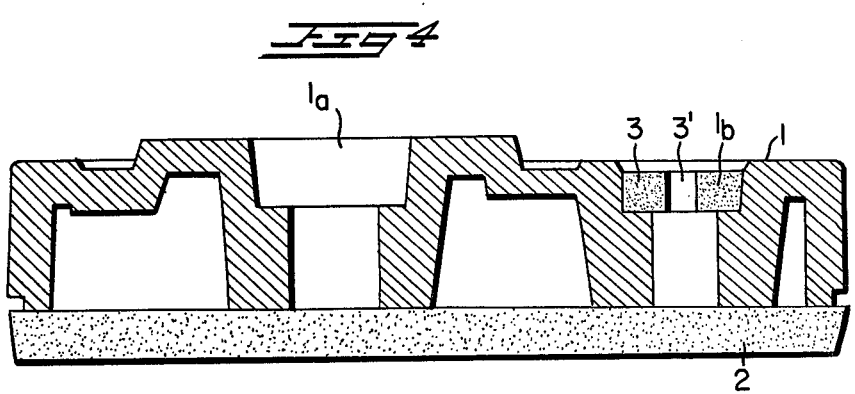
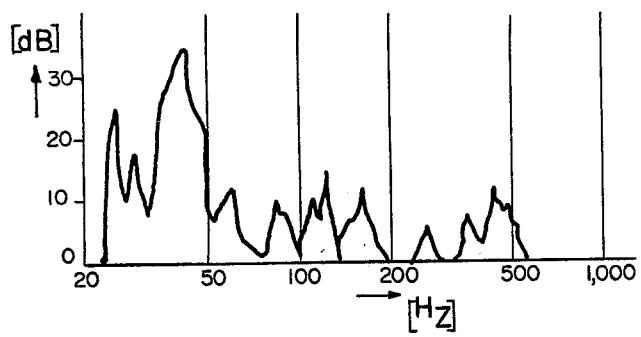
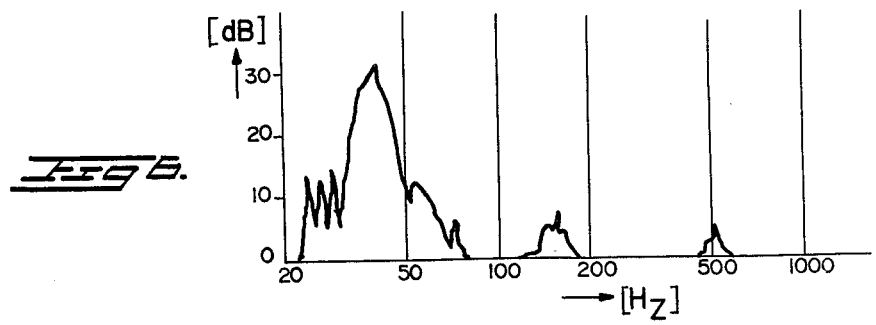

RECORD PLAYER CABINET

BACKGROUND OF THE INVENTION

1. Field of the Invention

This invention relates to an improved cabinet for record players.

2. Discussion of Prior Art

Previously, record player cabinet materials have included wood and resin concrete. A resin concrete material of comparatively large mass which can be molded has been formed by compression of crushed small stones in unsaturated polyester resin to which calcium carbonate has been added for adhesion between the small stones. The resonance characteristics of this material are illustrated in FIG. 1, which indicates the characteristics are comparatively good in low ranges below 1,000 Hz but there is much resonance in frequency bands exceeding 1,000 Hz. This indicates distortion in the attenuation characteristics in the high bands and it means the sound quality will be poor.

Further, when the resonance characteristics of wood, for example, homogenized chip board are considered, as FIG. 2 illustrates, the resonance is greater in the low ranges below 1,000 Hz than for resin concrete but in the high ranges, the resonance decreases. This means that while there may be some defects in terms of tone quality, howling will readily occur since there is resonance in the low ranges.

As indicated above, materials previously used in record players have various defects. Thus, it has not been possible to produce a cabinet for record players which prevents howling without worsening tone quality.

SUMMARY OF THE INVENTION

Thus, an objective of this invention is to provide a cabinet for record players which is satisfactory both in terms of howling and tone quality.

Other objects and advantages of this invention will be apparent from a reading of the following specification and claims taken with the drawing.

BRIEF DESCRIPTION OF THE DRAWING

FIG. 3 is a perspective view of an illustrative embodiment of this invention excluding the tone arm.

FIG. 4 illustrates only the cabinet portion in a cross sectional view along line A — A' of FIG. 3.

FIG. 5 is a graph of the resonance characteristics of a cabinet body made only of resin concrete.

FIG. 6 is a graph of the resonance characteristics of the cabinet of this invention illustrated in FIG. 3.

DETAILED DESCRIPTION OF A PREFERRED EMBODIMENT OF THE INVENTION

Figure 1:
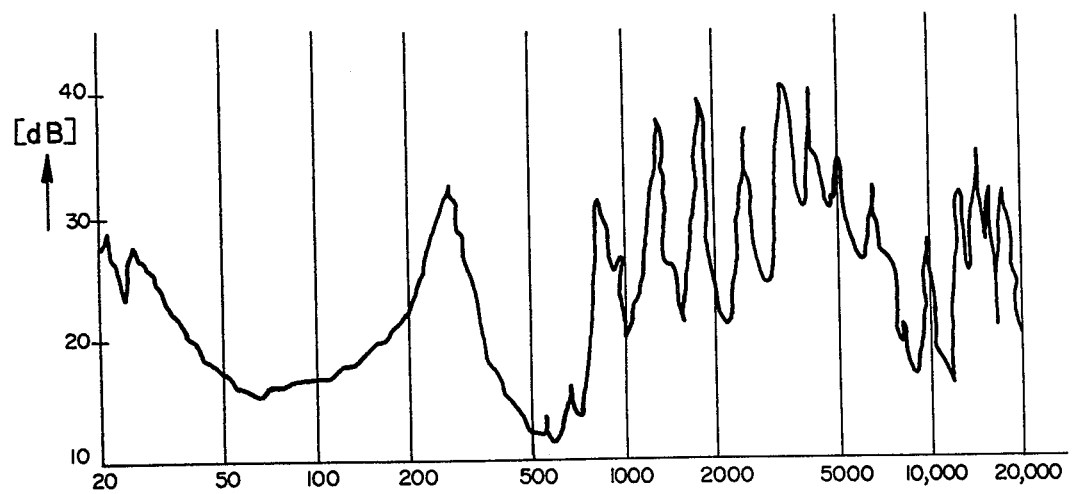
FIG. 1 is a graph of the resonance characteristics of resin concrete.

FIG. 3 is a perspective view of an illustrative embodiment of this invention and illustrates a record player excluding the tone arm while FIG. 4 is a cross sectional view of the cabinet only along line A — A' of FIG. 3.

A cabinet body 1 is molded by compression of comparatively hard resin concrete or BMC (Balk Molding Compound) having great mass. Cabinet body 1 has openings 1a established for a turntable 4 and 1b for the tone arm (not shown). A plate 3 for the tone arm is fitted in hole 1b. In this illustrative embodiment, plate 3 for the tone arm device is a homogenized chip board 21 mm thick and 180 mm in diameter. The shaft of the tone arm is inserted in a hole 3' in the center of plate 3.

A base 2 composed of 18 mm thick homogenized chip board is affixed to the bottom of cabinet body 1 so that the two have the greatest possible area of contact.

The following table illustrates the vibration attenuation rates of the material used in the above cabinet.

| Material | Vibration Attenuation Rate | | |
|---|---|---|---|
| Frequency | 250 Hz | 631 Hz | 1357 Hz |
| Resin concrete | 0.28 | 0.0799 | 0.096 |
| Frequency | 220 Hz | 392 Hz | 935 Hz |
| Lauan plywood | 0.067 | 0.15 | 0.13 |
| Frequency | 118 Hz | 463 Hz | 987 Hz |
| Homogenized chip board | 0.15 | 0.11 | 0.08 |
| Frequency | 250 Hz | 636 Hz | 1034 Hz |
| B M C | 0.216 | 0.078 | 0.049 |

Figure 2:
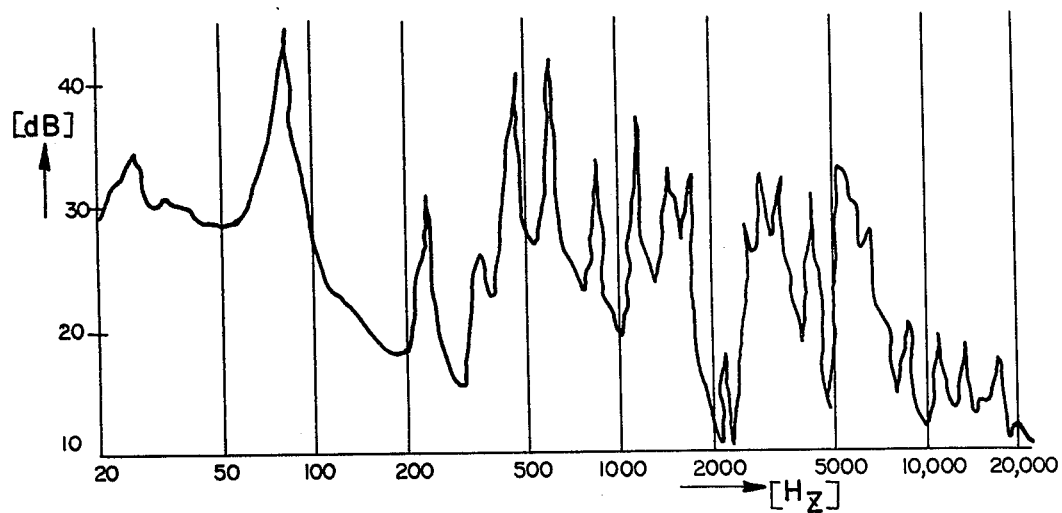
FIG. 2 is a graph of the resonance characteristics of homogenized chip board.

The table indicates resin concrete and BMC have high attenuation rates in low ranges while lauan plywood and homogenized chip board are superior to resin concrete in comparatively high ranges. Consideration of these vibration attenuation rates with the resonance characteristics of homogenized chip board as well as resin concrete illustrated in FIGS. 1 and 2 leads to the conclusion that a cabinet with favorable characteristics can be produced by a combination of materials which are effective in low ranges such as resin concrete with materials which are effective in high ranges such as homogenized chip board. FIG. 6 illustrates measurement results using a record player cabinet constructed as shown in FIGS. 3 and 4. The measurement method involved placement of speakers 1 mm away from the record player, producing sounds at each frequency using the speakers and using a level recorder for pickup at the position of plate 3 riding on the tone arm of the record player. FIG. 5 illustrates the characteristics of cabinet body 1 made of resin concrete for purposes of comparison where considerable resonance is seen from 100 to 1,000 Hz. With the record player cabinet illustrated in FIG. 3, virtually no resonance occurs especially from 100 Hz to 1,000 Hz as shown in FIG. 6. This is a great improvement in the resonance characteristics. In addition, the cabinet in the frequency band below 50 Hz has virtually the same characteristics as resin concrete which is effective in low ranges so that the cabinet is effective with respect to howling without having adverse effects on tone quality.

As stated above, this device utilizes comparatively hard material with large mass such as resin concentrate as the body of a cabinet for a record player. By combination of that body with wood which has opposite characteristics, a cabinet can be produced which does not give rise to howling yet which does not have an adverse effect on tone quality. By using material which can be molded in the cabinet body, production is simple and mass production is feasible.

The above embodiment involved resin concentrate and homogenized chip board if the cabinet body is of moldable material with great mass and high solidity, there need not be a restriction to resin concrete only since materials such as BMC could be used. In a similar manner, the wood in the base and plate need not be restricted to homogenized chip board. Plywood or nonlaminated wood could also be used.

What is claimed is:

1. A cabinet for a record player comprising a cabinet body being composed of a rigid material having a vibration attenuation rate characteristic such that a majority of the vibration attenuation rates in a first frequency range are generally greater than those in a second frequency range higher than that of said first frequency range, a base adhered to the bottom of said cabinet body, a plate adapted for attachment of a tone arm, said base and plate materials are selected from the group consisting of homogenized chip board, plywood and non-laminated wood, said plate being adhered to the top of said cabinet body, said base and plate being composed of rigid materials having vibration attenuation rate characteristics such that a majority of the vibration attenuation rates thereof in said second frequency range are greater than the respective corresponding vibration attenuation rates of said cabinet body in said second frequency range to thereby enhance the resonance characteristic of said cabinet in said second frequency range, and the said vibration attenuation rate characteristic of said cabinet body being such that a majority of the vibration attenuation rates thereof are greater than the respective corresponding vibration attenuation rates of said plate and base in said first frequency range to thereby lessen the tendency for howling to occur.

2. A cabinet as in claim 1 where said cabinet body material is selected from the group consisted of resin concrete and Balk Molding Compound.

3. A cabinet as in claim 1 where said cabinet body material is moldable.

4. A cabinet for a record player comprising a cabinet body being composed of a rigid material having a vibration attenuation rate characteristic such that a majority of the vibration attenuation rates in a first frequency range are generally greater than those in a second frequency range higher than that of said first frequency range, a plate adapted for attachment of a tone arm, said plate material is selected from the group consisting of homogenized chip board, plywood and non-laminated wood, said plate being adhered to the top of said cabinet body, said plate being composed of a rigid material having a vibration attenuation rate characteristic such that a majority of the vibration attenuation rates thereof (a) in said second frequency range are greater than the respective corresponding vibration attenuation rates of said cabinet body in said second frequency range to thereby enhance the resonance characteristic of said cabinet in said second frequency range, and the said vibration attenuation rate characteristic of said cabinet body being such that a majority of the vibration attenuation rates thereof are greater than the respective corresponding vibration attenuation rates of said plate in said first frequency range to thereby lessen the tendency for holwing to occur.

5. A cabinet as in claim 4 where said cabinet body material is selected from the group consisting of resin concrete and Balk Molding Compound.

6. A cabinet as in claim 4 where said cabinet body material is moldable.

* * * * *